US012574361B2

(12) United States Patent
Todorovski et al.

(10) Patent No.: US 12,574,361 B2
(45) Date of Patent: Mar. 10, 2026

(54) ELIMINATING A REDUNDANT LOGIN BY LEVERAGING A SECURE POSIX ENVIRONMENT SESSION

(71) Applicant: International Business Machines Corporation, Armonk, NY (US)

(72) Inventors: Igor Todorovski, Toronto (CA); Neil Alan Johnson, Cornwall, NY (US); Eric Rosenfeld, Pleasant Valley, NY (US); Michael Stephen Fulton, Brackendale (CA); Anthony Giorgio, Poughkeepsie, NY (US); Edmund Horst Reinhardt, Campbellville (CA)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 18/677,476

(22) Filed: May 29, 2024

(65) Prior Publication Data

US 2025/0373595 A1 Dec. 4, 2025

(51) Int. Cl.
H04L 9/40 (2022.01)

(52) U.S. Cl.
CPC ................................ H04L 63/0815 (2013.01)

(58) Field of Classification Search
CPC ................................................... H04L 63/0815
See application file for complete search history.

(56) References Cited

U.S. PATENT DOCUMENTS

| | | | |
|---|---|---|---|
| 9,286,459 B2 * | 3/2016 | Hogg | H04L 9/3234 |
| 9,300,671 B1 | 3/2016 | Barak et al. | |
| 10,333,925 B2 | 6/2019 | Schwarz et al. | |
| 2021/0034748 A1 * | 2/2021 | Ahmed | G06F 21/572 |
| 2022/0027454 A1 | 1/2022 | Caldarale et al. | |

* cited by examiner

*Primary Examiner* — Huan V Doan
(74) *Attorney, Agent, or Firm* — Patterson + Sheridan, LLP

(57) ABSTRACT

Embodiments herein describe bypassing a step that would otherwise prompt a user to manually input credentials to access a traditional environment after establishing connection to a POSIX environment. In some embodiments, the credentials used to login to the POSIX compliant environment can be automatically inputted into a field that enables access to a traditional environment. In other embodiments, the use of archived credentials can be used once a connection to a POSIX compliant environment is established, providing access to a traditional environment. Additionally, a level of trust between the POSIX compliant environment and the traditional environment can be established enabling access to the traditional environment.

20 Claims, 6 Drawing Sheets

100

300

310
ESTABLISHING A SECURE CONNECTION
TO A POSIX COMPLIANT ENVIRONMENT

320
INDICATING DESIRE TO ACCESS
TRADITIONAL ENVIRONMENT

330
AUTOMATICALLY CONFIRMING
APPROPRIATE CREDENTIALS TO ACCESS
TRADITIONAL ENVIRONMENT ARE
SATISFIED

340
AUTOMATICALLY ACCESSING THE
TRADITIONAL ENVIRONMENT

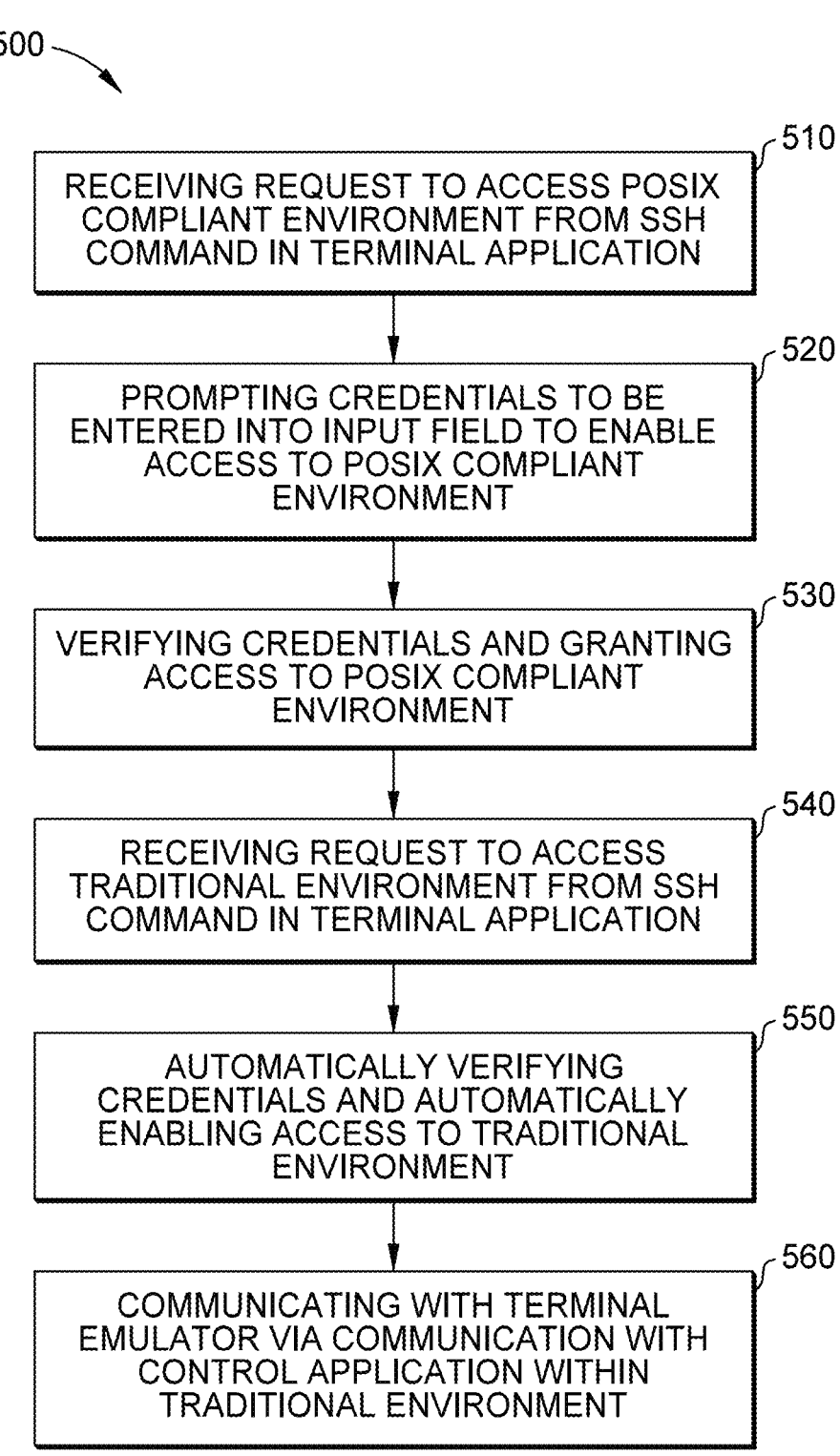

500

RECEIVING REQUEST TO ACCESS POSIX COMPLIANT ENVIRONMENT FROM SSH COMMAND IN TERMINAL APPLICATION
510

PROMPTING CREDENTIALS TO BE ENTERED INTO INPUT FIELD TO ENABLE ACCESS TO POSIX COMPLIANT ENVIRONMENT
520

VERIFYING CREDENTIALS AND GRANTING ACCESS TO POSIX COMPLIANT ENVIRONMENT
530

RECEIVING REQUEST TO ACCESS TRADITIONAL ENVIRONMENT FROM SSH COMMAND IN TERMINAL APPLICATION
540

AUTOMATICALLY VERIFYING CREDENTIALS AND AUTOMATICALLY ENABLING ACCESS TO TRADITIONAL ENVIRONMENT
550

COMMUNICATING WITH TERMINAL EMULATOR VIA COMMUNICATION WITH CONTROL APPLICATION WITHIN TRADITIONAL ENVIRONMENT
560

FIG. 5

ELIMINATING A REDUNDANT LOGIN BY LEVERAGING A SECURE POSIX ENVIRONMENT SESSION

BACKGROUND

The present invention relates to eliminating a redundant step when a user wishes to access a traditional computing environment. More specifically, to allowing a user to automatically log into a traditional environment without being prompted with an additional credential check.

Some network devices (e.g., mainframe servers) use operating systems that support a traditional (or legacy) environment for controlling legacy functions that are not controllable by modern operating systems. A traditional environment may nonetheless be accessed frequently by a user. However, a traditional environment is generally not easily accessed or run, as it is usually grounded in legacy infrastructure. A traditional environment may only run on specific hardware. In this case, communicating with a traditional environment using a modern computer uses a terminal emulator. Terminal emulators allow its host device (a modern computer) to use a protocol or messaging type that is recognizable to a traditional environment, thus allowing a modern computer to configure and manage the traditional environment. Traditional environments may contain a control application, which typically manages functions of a remote server that houses the traditional environment.

Though different ways to access a traditional environment exist, they generally prompt the user to enter credentials to access it.

SUMMARY

According to one embodiment herein, a method is provided. The method includes establishing a secure connection from a user device to a POSIX compliant environment in an operating system of a remote server; and after establishing the secure connection to the POSIX compliant environment: determining that the user device desires access to a traditional environment in the operating system of the remote server, and automatically connecting the user device to the traditional environment using the POSIX compliant environment, where the user device uses a terminal emulator to communicate with a control application executing in the traditional environment via the secure connection, where the control application controls one or more functions of the remote server.

According to another embodiment herein, a system is provided. The system includes one or more computer processors; and a memory containing a program which when executed by one or more computer processors performs an operation, the operation including: establishing a secure connection from a user device to a POSIX compliant environment in an operating system of a remote server; and after establishing the secure connection to the POSIX compliant environment: determining that the user device desires access to a traditional environment in the operating system of the remote server, and automatically connecting the user device to the traditional environment using the POSIX compliant environment, where the user device uses a terminal emulator to communicate with a control application executing in the traditional environment via the secure connection, where the control application controls one or more functions of the remote server.

According to another embodiment herein, a computer-readable storage medium having computer-readable program code is provided. The computer-readable program code is executable by one or more computer processors to establish a secure connection from a user device to a POSIX compliant environment in an operating system of a remote server; and after establishing the secure connection to the POSIX compliant environment: determine that the user device desires access to a traditional environment in the operating system of the remote server, and automatically connect the user device to the traditional environment using the POSIX compliant environment, where the user device uses a terminal emulator to communicate with a control application executing in the traditional environment via the secure connection, where the control application controls one or more functions of the remote server.

BRIEF DESCRIPTION OF THE DRAWINGS

FIG. 5 illustrates a flowchart for executing a traditional environment, according to one embodiment.

DETAILED DESCRIPTION

Figure 1:
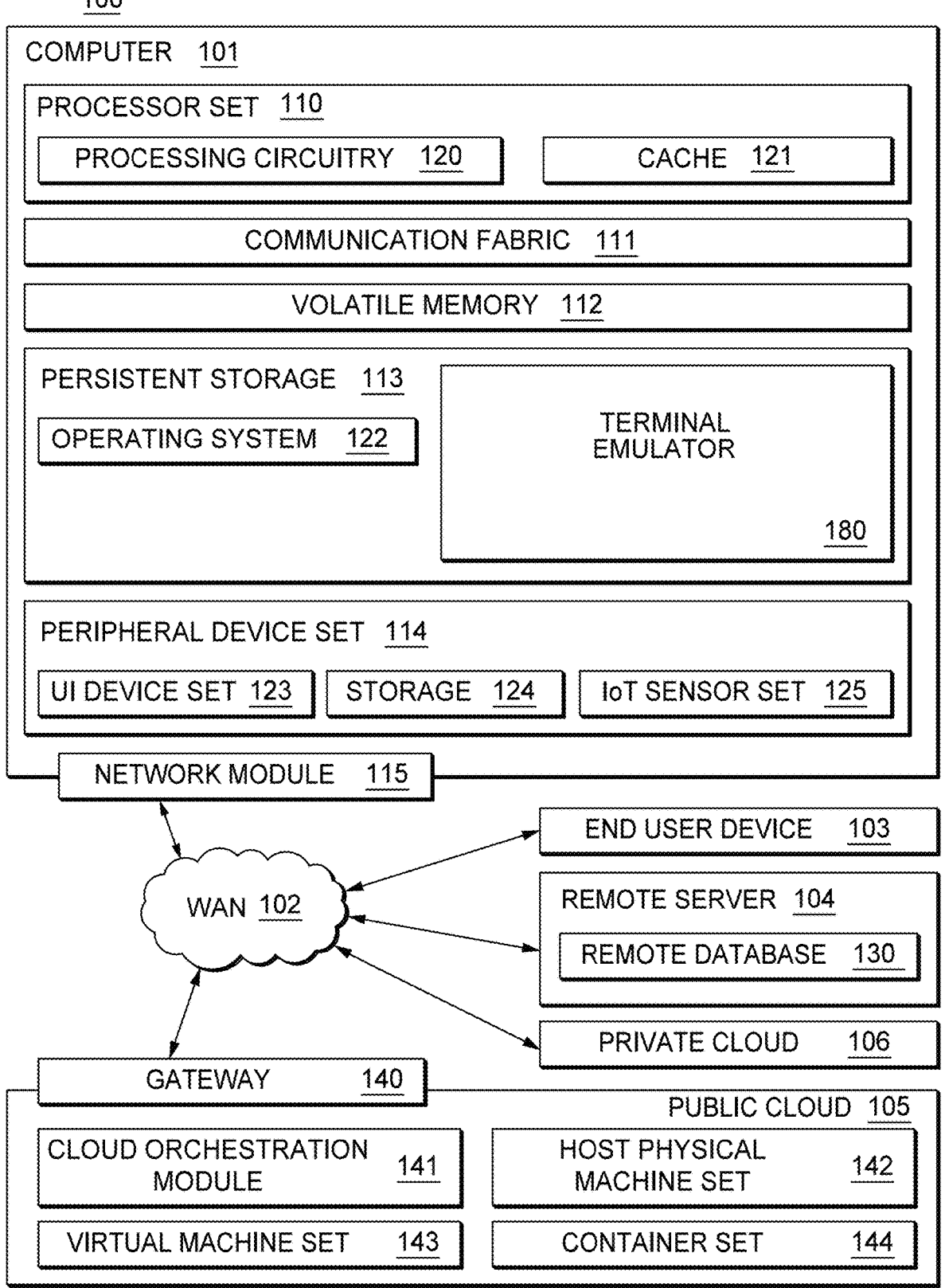
FIG. 1 illustrates a computing environment, according to one embodiment.

Embodiments herein allow a user device to automatically log in to a traditional environment in an operating system after successfully logging into a POSIX (Portable Operating System Interface) compliant environment. That is, a user can bypass a step that would otherwise prompt a user to manually input credentials to access a traditional environment after establishing connection to the POSIX compliant environment. Once a user device establishes a secure connection to a POSIX compliant environment of a remote server, the user device may wish to access a traditional environment also within the remote server. Asking the user to log into the traditional environment is for security purposes, but is redundant, especially if credentials were already used to establish a secure connection the POSIX Compliant environment from the user device.

Embodiments herein describe how credentials enabling access to the traditional environment can be verified automatically, rather than manually inputted. In some embodiments, the credentials used to login to the POSIX compliant environment can be automatically inputted into a field that enables access to a traditional environment. In other embodiments, there is a level of trust between the POSIX compliant environment and the traditional environment such that granting the user device access to the POSIX compliant environment enables the user device to access that traditional environment. In these embodiments, the user device does not have to manually provide credentials to access a traditional environment after establishing a secure connection to a POSIX compliant environment.

Automatically verifying credentials to establish a connection to a traditional environment after securely connecting to a POSIX compliant environment from a user device provides a myriad of benefits. It limits the room for user error, as a user device would have to provide credentials only once. The technical benefits it provides include a more secure log in process since logging into the POSIX compliant environment supports more secure methods (e.g., public/private keys) than using a username/password which is often used to log into a traditional environment. Limiting the number of login attempts, using programming to verify credentials, among other things create a higher level of security. Additionally, it can allow for improved password management, as an automated system can more easily enforce password policies (such as regular password changes, complexity standards, etc.) across logging into the traditional environment and the POSIX compliant environment simultaneously. Furthermore, automated systems provide improved monitoring capabilities, as the overarching organization can more easily monitor log in attempts to the traditional environment, flagging suspicious activity more easily, and improving response times to security threats, among other things.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as Terminal emulator 180, allowing to communication with a traditional environment in a remote server. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
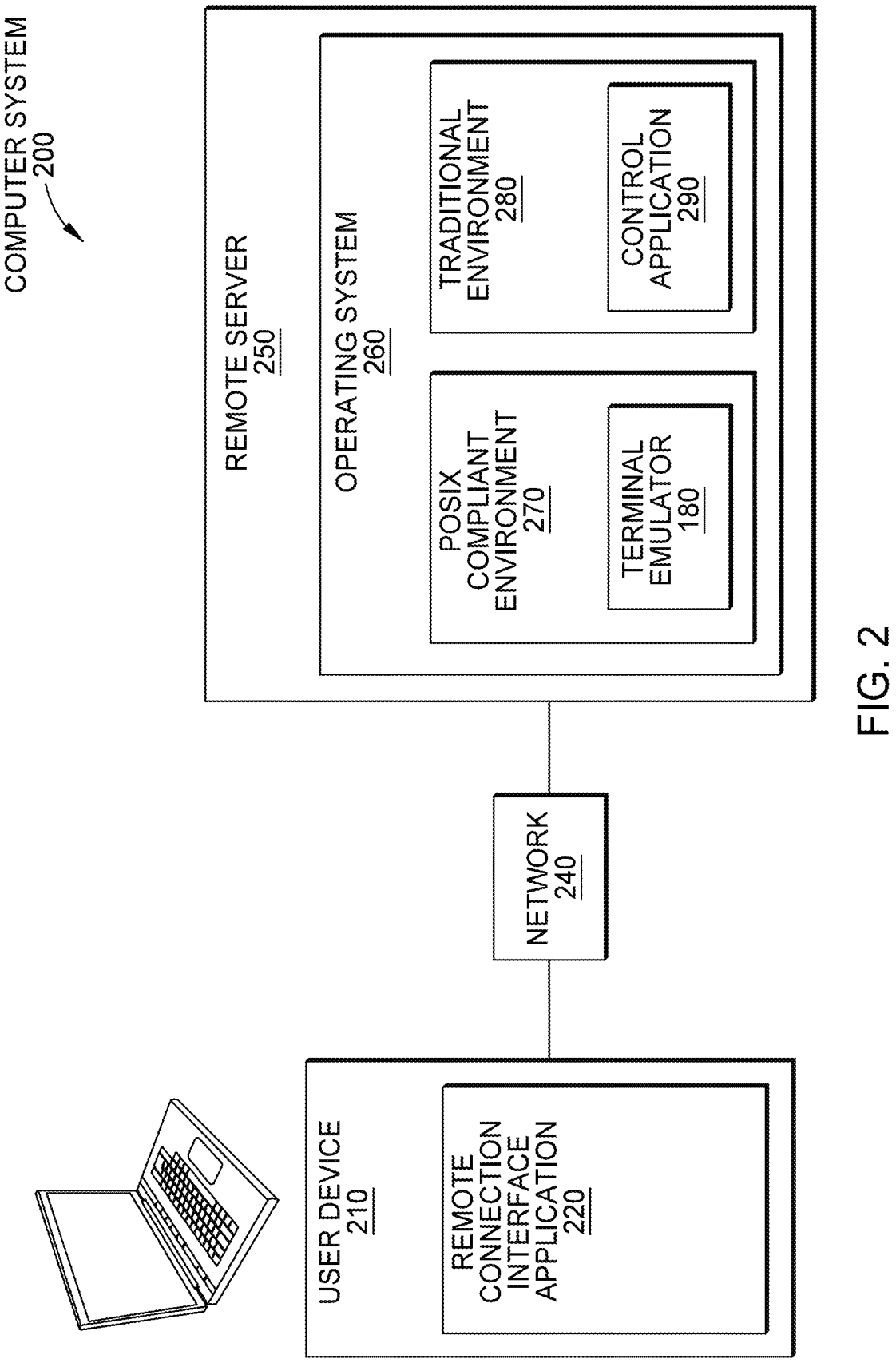
FIG. 2 illustrates a computer system showing the components used to access a traditional environment, according to one embodiment.

FIG. 2 depicts a computing system 200 used to access a traditional environment, according to the embodiments described herein. Computing system 200 includes a User Device 210 and a Remote server 250 that are communicatively coupled by a Network 240. Within User Device 210, Remote Connection Interface Application 220 is included.

User Device 210 may be a computing device such as a laptop computer, desktop computer, or mobile device with a central processing unit, among other types of computing devices. User Device 210 may be a computing device configured with a text-based user interface enabling communication between a user and the device. Examples of text-based user interfaces include command-line interfaces such as the terminal application, or other similar applications.

Remote Connection Interface Application 220 may be an application accessible via a text based user interface. A text base user interface allows a user to enter commands that direct a computing device, such as User Device 210, to perform specific tasks. In a terminal application, this is referred to as inputting a command-line argument. In one embodiment, remote Connection Interface Application 220 is an application accessible within User Device 210 via a text based user interface (e.g. the terminal application). Additionally, Remote Connection Interface Application 220 may provide a graphical user interface (GUI) that the user device displays. Remote Connection Interface Application may translate user commands received from the GUI to text based commands.

Text based user interfaces allow a user to effectively instruct a computing device to carry out their instructions. The instructions are generally written into the user interface application via text. For example, in a terminal application, these instructions are written into the terminal application as command-line arguments. Command-line arguments are written instructions from the user into the terminal application. Command-line arguments indicate that a user desires the computing device to carry out what the user writes into the terminal application. Examples of tasks command-line arguments instruct a computing device to fulfill include deleting a file, renaming a disk, reformatting a disk, or displaying the contents of a directory, among a plethora of other desired tasks ranging in complexity. The structure of command-line arguments usually maintains certain metrics to be met in order for a computing device to accurately read the argument and perform the desired instructions. For example, within a terminal application, it may be that each command-line arguments must be separated by a single space, or that the argument must be written within single quotes, among other formatting requirements.

Remote Connection Interface Application 220 may be an application used to securely connect User Device 210 to Remote Server 250. Remote Connection Interface Application 220 can establish a secure shell (SSH), providing a secure way to access another computer, such as Remote Server 250, over a potentially unsecured network, such as Network 240.

SSH is a command-line tool that establishes a secure connection between a computing device, such as User Device 210, and a remote server, such as Remote Server 250, over a network that may not be secure, such as Network 240. The security of the connection is achieved through myriad mechanisms, including encryption, authentication, ensuring data integrity, port forwarding/tunneling among others.

Methods of using encryption may include encrypting all data exchanged between a computing device such as User Device 210 and a remote server such as Remote Server 250. Methods of authentication include using cryptographic keys to authenticate the computing device, such as User Device 210, and the remote server, such as Remote Server 250. This ensures both parties' identities are valid. Password authentication and public/private key authentication are also supported by SSH.

Public and private key authentication involves the creation of a public key and a private key. The public key is shared with a remote server after it is created, and the private key is securely stored in a user device after it is created. They are created using encryption. Then, the public key may be uploaded to the remote server from the user device. When the computing device wishes to connect to the remote server using SSH, the remote server may prompt the computing device to present its private key, which can be provided by the Remote Connection Interface Application 220. The public key in the remote server verifies the private key it is presented with as acceptable through decryption. Upon successful decryption the computing device has access to the server.

With respect to the figures, the use of public/private key authentication may involve a public key shared from User Device 210 with Remote Server 250. Upon initiating a secure connection to POSIX Compliant Environment 270 using Remote Connection Interface Application 220, User Device 210 may be prompted to verify its identity with its private key which would be authenticated using the public key shared with Remote Server 250. After authentication, access to Remote Server 250 would be granted.

Public/private key authentication is generally more secure than mere password-based authentication.

Password and username authentication usually entails a password and username combination entered into a computing device, such as User Device 210. This combination can be verified as the correct combination by a remote server such as Remote Server 250.

Port forwarding is a feature of SSH protocol that allows a user to securely tunnel network connections from one network port to another. It allows secure connections from computing devices to remote servers to be made. A secure tunnel can be created from a computing device to a remote server, and information from the computing device may reach the remote server through the created tunnel to a specific port on the remote server. This technique may be used to access sensitive information that may otherwise be behind a firewall, access otherwise blocked services, or allowing shared information to be encrypted if connection to a remote server is happening over a public network (e.g. public Wi-Fi).

The remote server 250 includes an operating system 260 which in turn includes two separate environments: a POSIX compliant environment 270 and a traditional environment 280 (also referred to as a legacy environment). In this example, the user can first use the Remote Connection Interface Application 220 (which may be entering the SSH command into the terminal application) to initiate communication with the POSIX Compliant Environment 270.

In one embodiment, establishing a secure connection to POSIX Compliant Environment 270 occurs once a secure connection is established to Remote Server 250.

A POSIX compliant environment refers to a system software that adheres to a set of standards that allows it to be compatible with different operating systems. POSIX standards define application programming interfaces (APIs), command-line interfaces, and other utility interfaces allowing software compatibility across different UNIX-like operating systems.

Features typically included in a POSIX compliant environment may be standardized system calls, standardized shells, standard utilities, standardized environment variables, etc. This standardization ensures a high degree of compatibility across different systems supporting a POSIX compliant environment. This benefits developers, among other professionals, as POSIX compliant environments allow code to be written and run across the range of POSIX compliant systems without much (if any) modification. Standardized system calls can include defining a set of system calls that allow access to operating system services such as file operations, among others. Some examples of POSIX compliant operating system calls are "open", "read", "write", "close", "wait", and "exit", among others. A standardized shell may specify appropriate syntax while a user interacts with a command-line. Standardizing environment variables may set specific variable names that work across all POSIX compliant environments configured to do/mean the same thing.

In the embodiments herein, User Device 210 securely connects to POSIX Compliant Environment 270, which is used by Operating System 260. Securely connecting to POSIX Compliant Environment 270 can be done using Remote Connection Interface Application 220 to establish a secure connection over Network 240 to Remote Server 250.

In the embodiments herein, Traditional Environment 280 may refer to functions that has been in place for a significant period of time. It may be that Traditional Environment 280 is grounded in technology that is outdated in some contexts. Traditional Environment 280 may have limited scalability and flexibility, but could still be important for different functions. Given the dated nature of the traditional environment 280, the user device 210 (and the remote connection interface application 220) may be unable to directly communicate with the traditional environment 280. For example, the traditional environment 280 may be unable to establish a secure communication link (e.g., SSH) with the user device 210. As such, the embodiments herein may leverage the standardized functions provided by the POSIX complaint environment 270 so that the user device 210 can communicate with the traditional environment 280. Executing within the POSIX compliant environment 270 is a Terminal emulator 180 configured to enable access and communication with a Traditional Environment 280 from the user device 210.

The Traditional Environment 280 includes Control Application 290. Control Application 290 may be used by User Device 210. Control Application 290 may be used by User Device 210 to change the configuration of Remote Server 250.

One non-limiting example, of a control application 290 can be a 3270 application on z/OS. A 3270 application on z/OS refers to a certain type of application that runs on a mainframe system. A mainframe system refers to a high performance computer system designed for handling complex computing tasks. Mainframes are usually used by larger organizations as a way of processing large volumes of data. They are generally reliable, scalable and secure. Mainframes often allow traditional environments, such as Traditional Environment 280, to run. Traditional environments are typically developed over long periods of time and may play a large role in the operations of a mainframe, and as such, may provide fundamental functions that are still relevant even as software and hardware have evolved and changed. Thus, a modern day operating system 260, such as z/OS can still include a traditional environment for supporting the control application 290. The 3270 application interacts with the terminal emulator 180.

Terminal emulator 180 may mimic the behavior of the software platform used by Traditional Environment 280, and more specifically, the control application 290. Mimicking the behavior of the software used by Traditional Environment 280 provides an opportunity to successfully access Traditional Environment 280 on a modern computer. In sum, Terminal emulator 180 enables communication between User Device 210 and Traditional Environment 280.

The interaction between the components of FIG. 1 allow continued use of a traditional environment, such as Traditional Environment 280, using a more modern device, such as User Device 210. Control Application 290 helps monitor the interaction between Traditional Environment 280 and its connection to User Device 210, ensuring operations continue to run smoothly.

Figure 3:
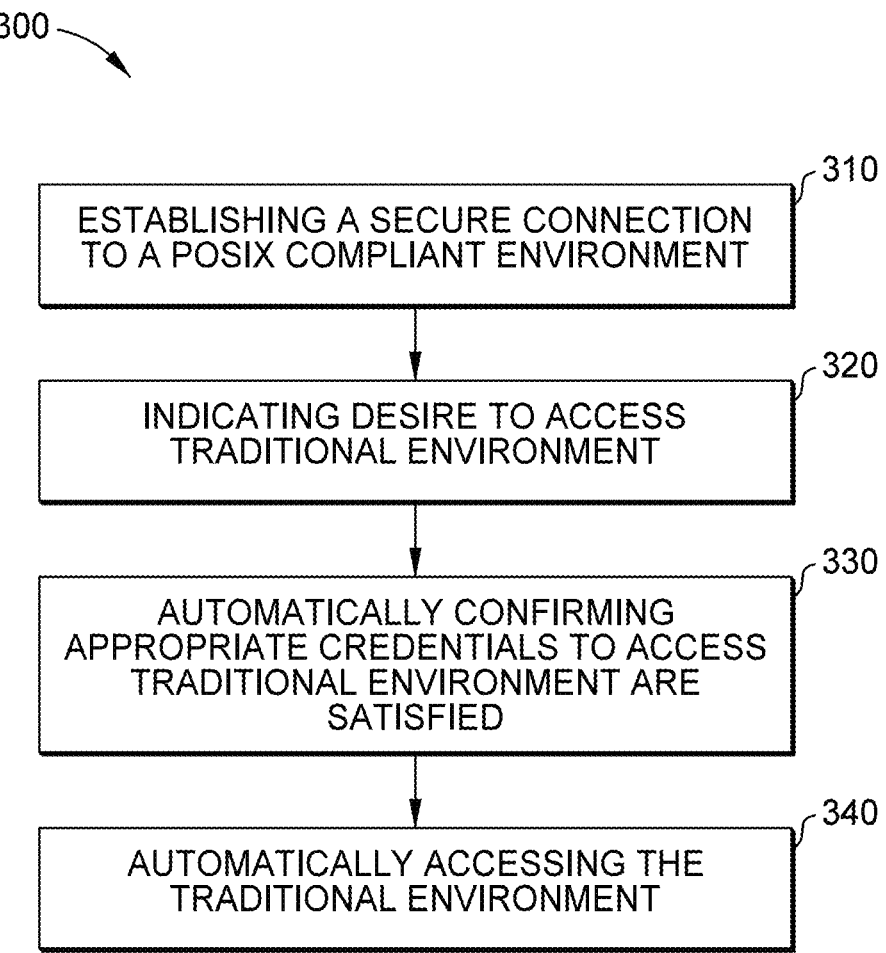
FIG. 3 illustrates a flowchart to access a traditional environment, according to one embodiment.

FIG. 3 illustrates a method 300 for logging into a traditional environment in a remote server, according to one embodiment described herein. At block 310, User Device 210 establishes a secure connection to a POSIX compliant environment.

At block 310, User Device 210 interacts with Remote Connection Interface Application 220, Network 240, Remote Server 250 and POSIX Compliant Environment 270.

POSIX Compliant Environment 270 may be used by Operating System 260 of Remote Server 250. Establishing a secure connection between User Device 210 and POSIX Compliant Environment 270 may use Remote Connection Interface Application 220 included in User Device 210.

In one embodiment, the Remote Connection Interface Application 220 establishes an SSH connection to POSIX Compliant Environment 270. User Device 210 may in turn be prompted to enter credentials as an authentication method to complete the connection. When the SSH connection to POSIX Complaint Environment 270 in Remote Server 250 is initiated, User Device 210 may be prompted to enter such credentials before the connection is fully established as a way to ensure secure connection.

In one embodiment of the current disclosure, an indication of a desire to access Traditional Environment 280 may be communicated by entering a separate argument into Remote Connection Interface Application 220 after a secure connection to POSIX Compliant Environment 270 has been established. In one embodiment, the indication is provided after the user starts to run Terminal emulator 180. For instance, after logged into SSH, the user can run a terminal emulator program (e.g. c3270) from the command-line. This starts the emulator, and can pass in a parameter (e.g. c3270—use-current-credentials) or indicate in some other way (e.g. environment variable, or alternate program, e.g. c3270ucc) to use the current credentials to log into the Traditional Environment 280.

In another embodiment of the present disclosure, an indication of a desire to access Traditional Environment 280 may be done in the same argument that establishes a secure connection to POSIX Compliant Environment 270 with User Device 210. This can be done by changing an SSH profile to automatically indicate desire to access Traditional Environment 280 when establishing a secure connection to POSIX Compliant Environment 270.

At block 330, credentials to access Traditional Environment 280 are verified. This verification step happens after a desire to access Traditional Environment 280 has been established. This automatic verification does not need further input from User Device 210. Rather, it is an automatic process happening within the components of FIG. 2.

Appropriate credentials may include a username and password combination, security tokens or one time password or cryptographic keys, biometric data such as fingerprints or face identification among others, security questions requiring the correct answer to proceed, access cards such as physical badges, among other forms of credentials.

One embodiment of the present disclosure involves an internal verification step. This step involves the credentials used to establish a secure connection between User Device 210 and POSIX Compliant Environment 270. In one embodiment of the present disclosure, the credentials used to establish a secure connection between User Device 210 and POSIX Compliant Environment 270 are stored and retrieved upon an indication of desire to access Traditional Environment 280. After retrieval, they may be entered into a separate input field. This input step may be done automatically by a computing device, as opposed to manually. After the credentials used to login to POSIX Compliant Environment 270 are automatically entered into a second input field that enables access to Traditional Environment 280, User Device 210 may be automatically logged in to Traditional Environment 280. This is described in more detail in FIG. 6.

Another embodiment of the present disclosure involves a level of trust established between POSIX Compliant Environment 270 and Traditional Environment 280. Traditional Environment 280 automatically trusts a device that establishes connection to POSIX Compliant Environment 270. This established trust entitles User Device 210 to automatically login to Traditional Environment 280 without providing credentials after already establishing a secure connection to POSIX Compliant Environment 270. This is also described in more detail in FIG. 6.

Another embodiment of the present disclosure allows User Device 210 to automatically login to Traditional Environment 280 using archived credentials that are accessed once a connection is established POSIX Compliant Environment via Remote Connection Interface Application 220. Once User Device 210 establishes a secure connection to POSIX Compliant Environment 270, because it is known that some sort of credentials were used to establish that connection, Traditional Environment 280 automatically retrieves and inputs separate stored credentials to grant User Device 210 access to Traditional Environment 280. This is also described in more detail in FIG. 6.

At Block 340 User Device 210 automatically accesses Traditional Environment 280. Automatic access implies User Device 210 did not have to manually enter credentials or manually verify permission to access Traditional Environment 280. Manual entry of credentials may be used to establish connection to POSIX Compliant Environment 270. However, after connection between User Device 210 and POSIX Compliant Environment 280 is established, verification and connection to Traditional Environment 280 is made automatically.

Figure 4:
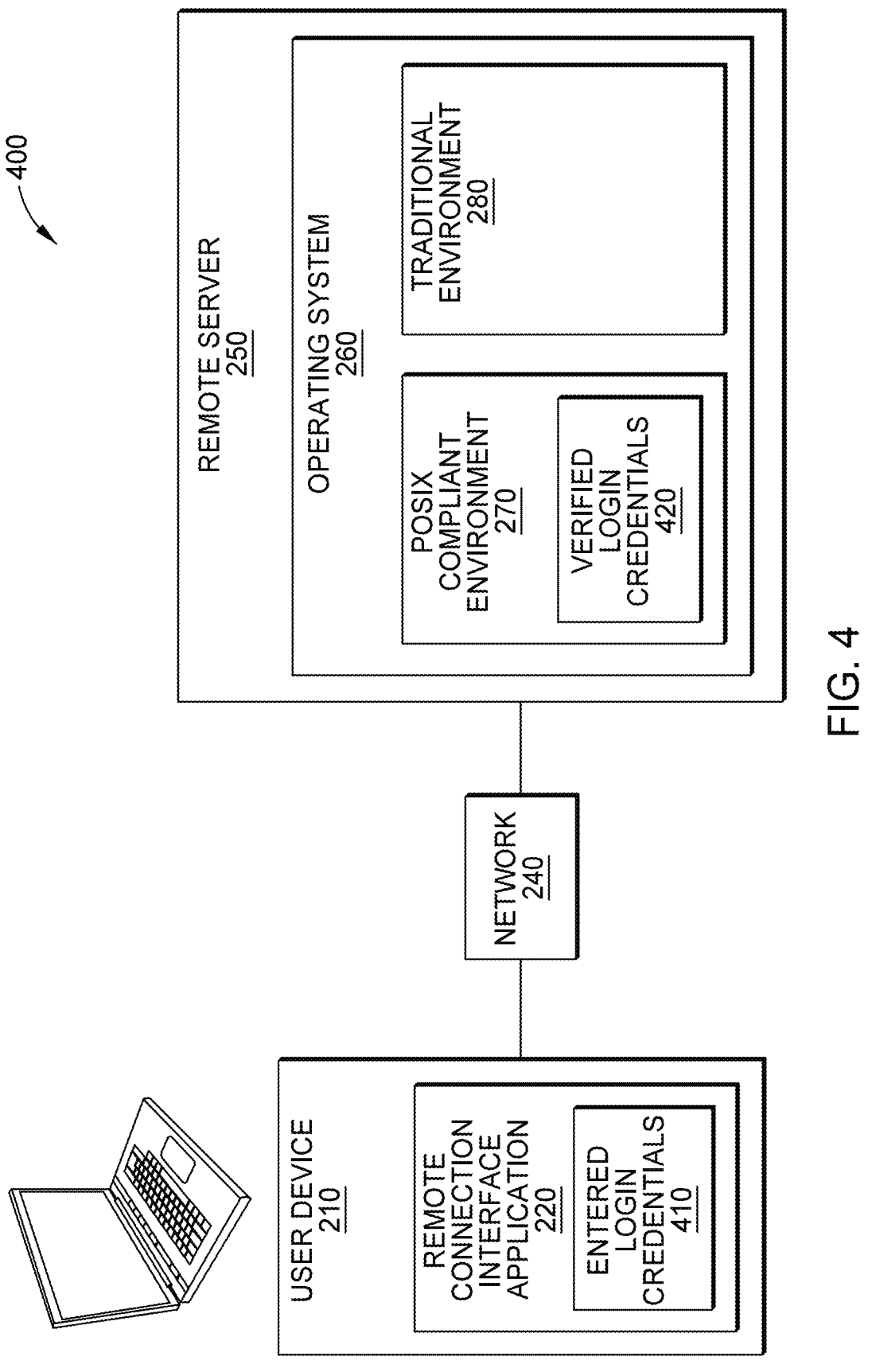
FIG. 4 illustrates using login credentials to access a traditional environment, according to one embodiment.

FIG. 4, in system 400, illustrates a system of performing block 330 of FIG. 3. Login Credentials 410 are inputted via Remote Application Interface 220. Login Credentials 410 are verified, and such Verified Login Credentials 420 enable a connection to POSIX Compliant Environment 270.

Entered Login Credentials 410 may be manually inputted within Remote Connection Interface Application 220. For example, Remote Connection Interface Application 220 may accept command-line arguments to establish an SSH connection with POSIX Compliant Environment 270 in Remote Server 250. After processing the inputted command-line arguments that establish an SSH connection, User Device 210 may be prompted with an input field to enter login credentials. Login credentials may include a username password and combination, among other things. Entered Login Credentials 410 may be verified as Verified Login Credentials 420, enabling User Device 210 to securely connect to POSIX Compliant Environment 270.

For example, if Remote Connection Interface Application 220 establishes an SSH shell, and Entered Login Credentials 410 are a username and password combination, POSIX Compliant Environment 270 will enable a connection between itself and User Device 210 after it verifies the username and password combination that serve as Entered Login Credentials 410.

Verification of a username password combination may comprise POSIX Compliant Environment 270 checking if the entered combination matches the combination it has stored in its system. If the combination matches and is therefore authenticated, Verified Login Credentials 420 enable User Device 210 to access POSIX Compliant Environment 270. This process of automatic verification, and automatic access to Traditional Environment 280 is discussed in more detail in FIG. 5.

FIG. 5 illustrates a method 500 to communicate with Terminal emulator 180. At block 510, the remote server receives a request from the user device to access the POSIX Compliant Environment. This request can be from an SSH command written into a terminal application executing on the user device. At block 520, User Device 210 is prompted with an input field requesting credentials that will be verified. At block 530, the Entered Login Credentials 410 are verified. Upon verification, User Device 210 will have established a secure connection to POSIX Compliant Environment 270. At Block 540, a second step taken after a secure connection to POSIX Compliant Environment 270 is established. At Block 540 a request is received to access Traditional Environment 280 from User Device 210. At Block 550, an automatic verification of credentials performed, where this automatic verification allows automatic access to Traditional Environment 280. At Block 560, after access to Traditional Environment 280 from User Device 210 is allowed, Terminal emulator 180 is communicated with, instructing communication between Terminal emulator 180 and Control Application 290. This communication enables Terminal emulator 180 to access and communicate with Traditional Environment 280.

At block 510, the request to access POSIX Compliant Environment 270 from User Device 210 may be an SSH command entered into a terminal application which may be represented as Remote Connection Interface Application 220. The request is received by POSIX Compliant Environment 270 in Remote Server 250, as the SSH command specifies a domain name. Generally, a domain name is a human-readable word meant to represent the internet protocol (IP) address that a user device desires to secure a connection with. This domain name is sent to a domain name query that provides an IP address associated with the domain name. Once the IP address of the desired location is determined, a secure connection between the user device and the IP address can be made. For example, User Device 210 may be securely connected to POSIX Compliant Environment 270 after the SSH command to connect User Device 210 and POSIX Compliant Environment 270 has been entered.

A secure connection to the domain name specified in an SSH Command is not always instantaneous. Block 520 describes that once POSIX Compliant Environment 270 receives the request from User Device 210, User Device 210 will be prompted with an input field requesting verifiable credentials. Once User Device 210 provides these credentials, which may be a username and password combination, block 530 is initiated.

At block 530, Entered Login Credentials 410 are verified as Verified Login Credentials 420. The connection between User Device 210 and POSIX Compliant environment 280 should be established. After this secure connection is established, block 540 describes Remote Server 250 receiving a request from User Device 210 requesting access to Traditional Environment 280. Similar to the request to connect to POSIX Compliant Environment 270, this may be in the form of an SSH command entered into a terminal.

In one embodiment, the request to access Traditional Environment 280 is automatic. The command used to connect to POSIX Compliant Environment 270 may include the desire to access Traditional Environment 280.

In another embodiment, the request to access Traditional Environment 280 is manual. Once a secure connection between User Device 210 and POSIX Compliant Environment 270 is established, User Device may send an additional command via an SSH command-line argument to communicate a desire to access Traditional Environment 280.

At Block 550, a verification step allowing User Device 210 to securely connect to Traditional Environment 280. Unlike at block 520, where User Device 210 may be prompted with an input field requesting verifiable credentials within which User Device 210 manually provides the requested credentials, the verification step of block 550 is automatic.

One embodiment of this automatic verification step involves the credentials used to establish a secure connection between User Device 210 and POSIX Compliant Environment 270. Verified Login Credentials 420 that are stored may be retrieved once a desire to access Traditional Environment 280 is established. After retrieval, Verified Login Credentials 420 may be entered into a separate input field specific to enable access to Traditional Environment 270. This input step may be done automatically by a computing device, as opposed to manually. After Verified Login Credentials 420 are automatically entered into a second input field that enables access to Traditional Environment 280, User Device 210 may be automatically logged in to Traditional Environment 280, establishing a secure connection.

Another embodiment of this automatic verification step involves a level of trust established between POSIX Compliant Environment 270 and Traditional Environment 280. Traditional Environment 280 automatically trusts a device that establishes connection to POSIX Compliant Environment 270. This established trust entitles User Device 210 to automatically login to Traditional Environment 280 without providing credentials after already establishing a secure connection to POSIX Compliant Environment 270.

Another embodiment of this verification step allows User Device 210 to automatically login to Traditional Environment 280 after establishing that credentials were used to establish a connection to POSIX Compliant Environment 270. Once User Device 210 establishes a secure connection to POSIX Compliant Environment 270, Traditional Environment 280 may retrieve archived login credentials to enable access to Traditional Environment 280. User Device 210 should then be automatically granted access to Traditional Environment 280. This is further described in FIG. 6.

At Block 560 Terminal emulator 180 is communicated with, which is within POSIX Compliant environment 270. Terminal emulator 180 is configured to communicate with Control Application 290 of Traditional Environment 280.

Terminal emulator 180 may mimic the behavior of the software used by Traditional Environment 280. Control Application 290 may be a software program that may be configured to manage or control various features of Traditional Environment 280 in communicating with it. Control Application 290 may communicate with Terminal emulator 180 to ensure performance of Traditional Environment using User Device 210 is optimum. Communication between Control Application 290 and Terminal emulator 180 may include providing specifications for how the software should emulated. Control Application 290 interacts with Traditional Environment 280 ensuring that Traditional Environment 280 is running optimally using Terminal emulator 180.

Figure 6:
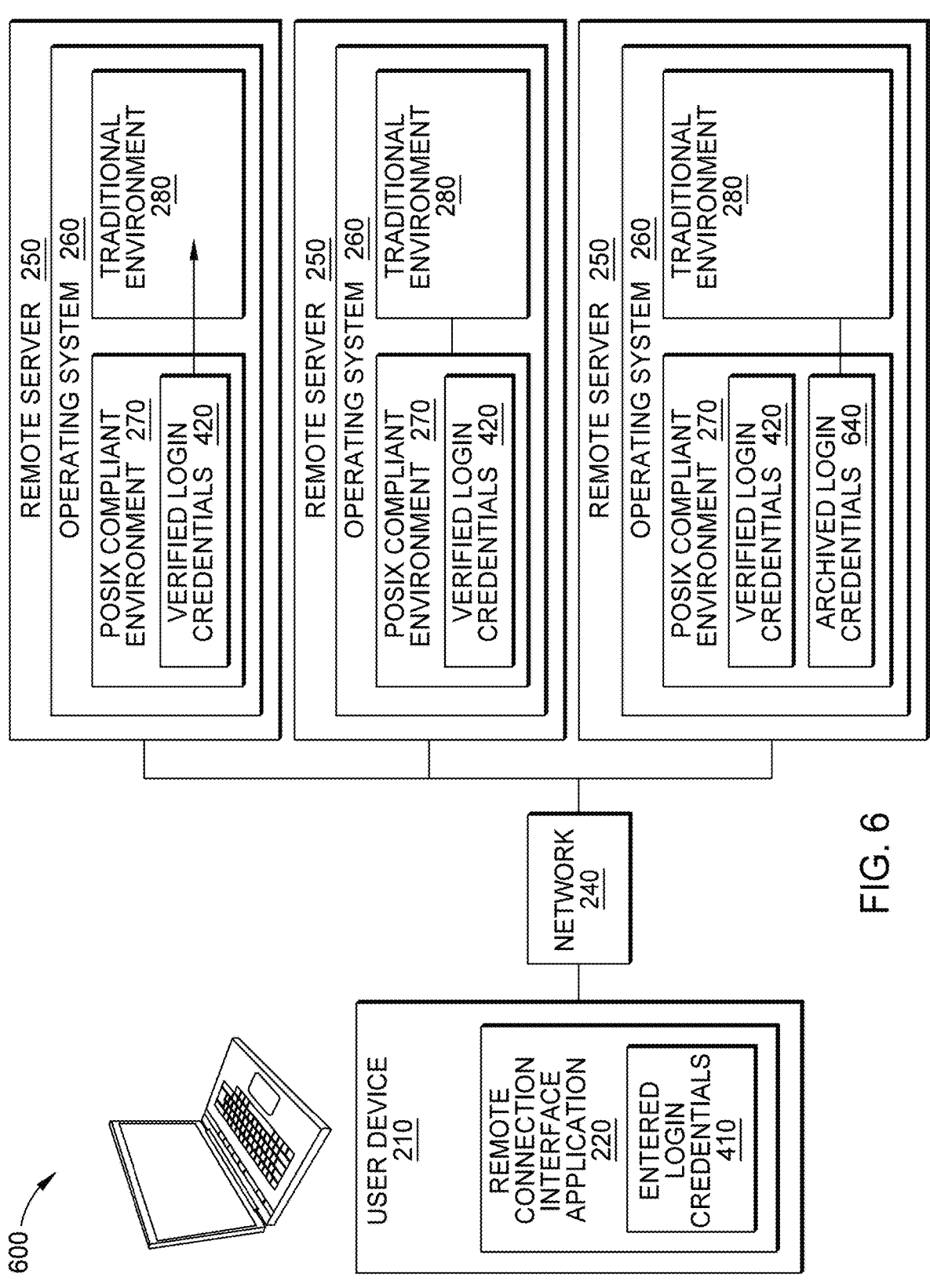
FIG. 6 illustrates multiple embodiments for performing an automatic verification to access a traditional environment, according to one embodiment.

FIG. 6 illustrates three different embodiments that block 330 of FIG. 3 and block 550 of FIG. 5 discuss. At Block 610 Verified Login Credentials 420 are retrieved by Traditional Environment 280. At Block 620, Verified Login Credentials 420 are not read by Traditional Environment 280. Rather, Traditional Environment 280 and POSIX Compliant Environment 270 have an established level of trust between them. This established level of trust entitles a user that establishes connection to POSIX Compliant Environment 270 the ability to connect to Traditional Environment 280. At Block 630 Verified Login Credentials 420 are used to access POSIX Compliant Environment 270. Access to Traditional Environment 280 uses separate Archived Login Credentials 640. Traditional Environment 280 will allow User Device 210 to securely connect to it using Archived Login Credentials 640 from POSIX Compliant Environment 270 separate from Verified Login Credentials 420 that were used to login to POSIX Compliant Environment 270.

At Block 610, Verified Login Credentials 420 are retrieved. After retrieval, Verified Login Credentials 420 may be entered into a separate input field specific to enable access to Traditional Environment 270. This input step may be done automatically by a computing device, as opposed to manually. After Verified Login Credentials 420 are automatically entered into a second input field that enables access to Traditional Environment 280. User Device 210 may be automatically logged in to Traditional Environment 280, establishing a secure connection.

At Block 620, a level of trust established between POSIX Compliant Environment 270 and Traditional Environment 280. Traditional Environment 280 automatically trusts a device that establishes connection to POSIX Compliant Environment 270. This established trust entitles User Device 210 to automatically login to Traditional Environment 280 without providing credentials after already establishing a secure connection to POSIX Compliant Environment 270.

At block 630 User Device 210 automatically logs in to Traditional Environment 280 using Archived Login Credentials 640 once a connection to POSIX Compliant Environment 270 is established using Verified User Credentials 420. Archived Login Credentials 420 can include a stored set of credentials within POSIX Compliant Environment 270 that are accessed to connect to Traditional Environment 280. Once User Device 210 establishes a secure connection to POSIX Compliant Environment 270, Traditional Environment 280 receive or retrieve Archived Login Credentials 240 to permit access.

While the foregoing is directed to embodiments of the present invention, other and further embodiments of the invention may be devised without departing from the basic scope thereof, and the scope thereof is determined by the claims that follow.

What is claimed is:

1. A method comprising:
   establishing a secure connection from a user device to a POSIX compliant environment in an operating system of a remote server; and
   after establishing the secure connection to the POSIX compliant environment:
   determining that the user device desires access to a traditional environment in the operating system of the remote server, and
   automatically connecting the user device to the traditional environment using the POSIX compliant environment, wherein the user device uses a terminal emulator to communicate with a control application executing in the traditional environment via the secure connection, wherein the control application controls one or more functions of the remote server.

2. The method of claim 1, wherein establishing the secure connection from the user device to the POSIX compliant environment uses manually provided credentials.

3. The method of claim 1, wherein automatically connecting to the traditional environment is done without receiving any credentials from the user device after the secure connection to the POSIX compliant environment is made.

4. The method of claim 3, wherein there is a level of trust established between the POSIX compliant environment and the traditional environment such that establishing the secure connection to the POSIX compliant environment entitles the user device to connect to the traditional environment without providing credentials.

5. The method of claim 3, wherein the credentials used to establish the secure connection to the POSIX compliant environment are also used to connect the user device to the traditional environment without the user device having to provide the credentials a second time.

6. The method of claim 1, wherein automatically connecting the user device to the traditional environment from the remote server to run on the user device comprises:
   retrieving credentials used to securely connect the user device to the POSIX compliant environment; and
   providing the credentials from the POSIX compliant environment to the traditional environment.

7. The method of claim 1, wherein receiving indication of a user device desiring access to the traditional environment is a command-line argument initiating the terminal emulator.

8. The method of claim 1, wherein the secure connection from the user device to the POSIX compliant environment in the operating system of the remote server is established via a remote connection interface application, wherein the remote connection interface application established a secure shell (SSH) with the remote server.

9. A system comprising:

one or more computer processors; and a memory containing a program which when executed by one or more computer processors performs an operation, the operation comprising:

establishing a secure connection from a user device to a POSIX compliant environment in an operating system of a remote server; and after establishing the secure connection to the POSIX compliant environment:

determining that the user device desires access to a traditional environment in the operating system of the remote server, and automatically connecting the user device to the traditional environment using the POSIX compliant environment, wherein the user device uses a terminal emulator to communicate with a control application executing in the traditional environment via the secure connection, wherein the control application controls one or more functions of the remote server.

10. The system of claim 9, wherein establishing the secure connection from the user device to the POSIX compliant environment uses manually provided credentials.

11. The system of claim 9, wherein automatically connecting to the traditional environment is done without receiving any credentials from the user device after the secure connection to the POSIX compliant environment is made.

12. The system of claim 11, wherein there is a level of trust established between the POSIX compliant environment and the traditional environment such that establishing the secure connection to the POSIX compliant environment entitles the user device to connect to the traditional environment without providing credentials.

13. The system of claim 11, wherein the credentials used to establish the secure connection to the POSIX compliant environment are also used to connect the user device to the traditional environment without the user device having to provide the credentials a second time.

14. The system of claim 9, wherein automatically connecting the user device to the traditional environment from the remote server to run on the user device comprises:

retrieving credentials used to securely connect the user device to the POSIX compliant environment; and providing the credentials from the POSIX compliant environment to the traditional environment.

15. The system of claim 9, wherein the secure connection from the user device to the POSIX compliant environment in the operating system of the remote server is established via a remote connection interface application, wherein the remote connection interface application established a secure shell (SSH) with the remote server.

16. A computer program product for accessing a traditional environment, the computer program product comprising:

a computer-readable storage medium having computer-readable program code embodied therewith, the computer-readable program code executable by one or more computer processors to:

establish a secure connection from a user device to a POSIX compliant environment in an operating system of a remote server; and after establishing the secure connection to the POSIX compliant environment:

determine that the user device desires access to a traditional environment in the operating system of the remote server, and automatically connect the user device to the traditional environment using the POSIX compliant environment, wherein the user device uses a terminal emulator to communicate with a control application executing in the traditional environment via the secure connection, wherein the control application controls one or more functions of the remote server.

17. The computer program product of claim 16, wherein the computer-readable program code is further executable to:

establish the secure connection from the user device to the POSIX compliant environment using manually provided credentials.

18. The computer program product of claim 17, wherein there is a level of trust established between the POSIX compliant environment and the traditional environment such that establishing the secure connection to the POSIX compliant environment entitles the user device to connect to the traditional environment without providing credentials.

19. The computer program product of claim 17, wherein the credentials used to establish the secure connection to the POSIX compliant environment are also used to connect the user device to the traditional environment without the user device having to provide the credentials a second time.

20. The computer program product of claim 16, wherein automatically connecting the user device to the traditional environment from the remote server to run on the user device comprises:

retrieving credentials used to securely connect the user device to the POSIX compliant environment; and providing the credentials from the POSIX compliant environment to the traditional environment.

* * * * *